(12) United States Patent
Shamoto et al.

(10) Patent No.: US 6,396,244 B2
(45) Date of Patent: May 28, 2002

(54) ELECTRIC ELEMENT CONTROL APPARATUS, BATTERY SYSTEM, AND INVERTER MOTOR SYSTEM

(75) Inventors: Sumikazu Shamoto, Nagoya; Masayuki Komatsu, Aichi-ken; Shoichi Sasaki, Okazaki; Tetsuhiro Ishikawa, Aichi-ken; Yukio Inaguma, Aichi-ken; Kazunari Moriya, Aichi-ken; Hiroki Ohtani, Aichi-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/818,588

(22) Filed: Mar. 28, 2001

(30) Foreign Application Priority Data

Apr. 7, 2000 (JP) ........................................ 2000-106983
Jun. 13, 2000 (JP) ........................................ 2000-176341

(51) Int. Cl.$^7$ .............................................. H01M 10/46
(52) U.S. Cl. ........................................ 320/119; 320/120
(58) Field of Search ................................. 320/109, 116, 320/117, 118, 119, 120, 121, 123

(56) References Cited

U.S. PATENT DOCUMENTS

| | | | | |
|---|---|---|---|---|
| 3,505,584 A | * | 4/1970 | Ford et al. | |
| 5,412,305 A | * | 5/1995 | Jeanneret | |
| 5,523,668 A | * | 6/1996 | Feldstein | |
| 5,629,601 A | * | 5/1997 | Feldstein | |
| 5,646,504 A | * | 7/1997 | Feldstein | |

FOREIGN PATENT DOCUMENTS

| | | |
|---|---|---|
| JP | A 05-207782 | 8/1993 |
| JP | A 10-337047 | 12/1998 |
| JP | A 10-337087 | 12/1998 |
| JP | A 11-55950 | 2/1999 |
| JP | A 11-55961 | 2/1999 |
| JP | A 11-178114 | 7/1999 |

* cited by examiner

*Primary Examiner*—Edward H. Tso
(74) *Attorney, Agent, or Firm*—Oliff & Berridge, PLC (57) ABSTRACT

To improve accuracy in controlling battery output, a charge-storage element is connected in parallel to a plurality of power source units. Each power source unit includes a power source element, and power transmission and reception between the power source element and a neutral point N side can be controlled by controlling the ratio of time over which an open/close switch remains closed, determined according to which among the voltage at the power source element or a voltage across the power source unit is larger or smaller. As an output of each power source element can be controlled, accuracy in output control for the combination battery can be improved.

11 Claims, 10 Drawing Sheets

ELECTRIC ELEMENT CONTROL APPARATUS, BATTERY SYSTEM, AND INVERTER MOTOR SYSTEM

BACKGROUND OF THE INVENTION

1. Field of the Invention

The present invention relates to a combination battery having a plurality of power source elements or electric elements, to a battery system having a plurality of combination batteries, and to an electric element control apparatus. The present invention relates also to an inverter motor system in which a DC is converted into a polyphase AC in an inverter to drive a polyphase AC, in particular, to an inverter motor system having an electric element with an operating voltage different from that of a polyphase AC motor.

2. Description of the Related Art

Conventionally, combination batteries having a plurality of power source elements have been known. In conventional combination batteries, because it is difficult to ensure a larger unit output voltage for each power source element, a plurality of power source elements, each with a lower unit output voltage relative to a desired output voltage, are serially connected so that a desired output voltage can be ensured as a whole. An example of the above structure is disclosed in Japanese Patent Laid-open Publication No. Hei 7-322516.

In the above described art, however, because the power source elements are serially connected, when an output of any one of the connected plurality of power source elements drops due to functional deterioration or other reasons, an output voltage of the whole battery accordingly drops by an amount equivalent to the drop in output of that power source element. In addition, in systems where an operational voltage of an auxiliary of an battery system differs from an output voltage of the battery of the battery system, a separate DC/DC converter must be provided.

Figure 10:
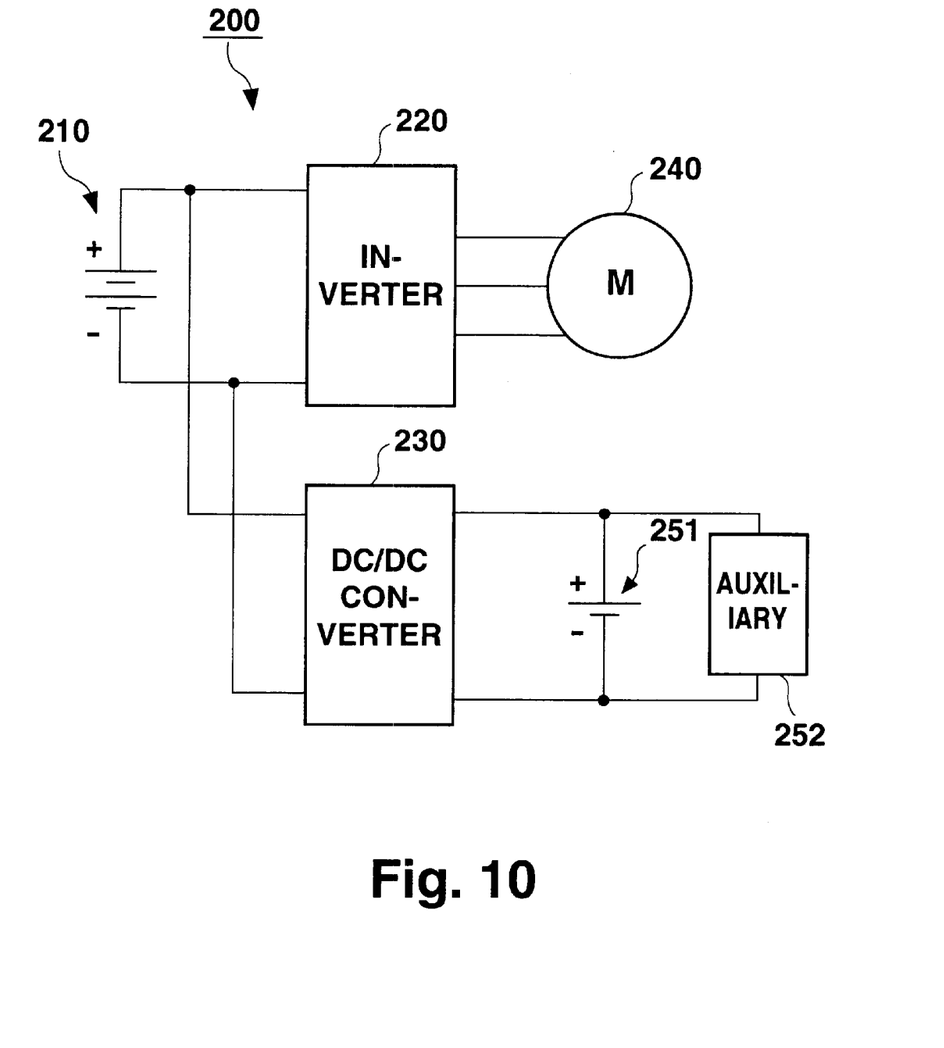
FIG. 10 is a diagram showing a conventional inverter motor system.

Also, an inverter motor system for driving an electric vehicle, as shown in FIG. 10, has conventionally been known as one type of inverter motor system as described above. This system 200, which drives a vehicle driving motor via an inverter using a high voltage source, comprises an auxiliary 252 and an auxiliary power source 252, the operating voltage of both of which differs from that of a polyphase AC motor 240. As the voltage required by the auxiliary is lower than a vehicle driving voltage, a voltage from a high voltage source 210 is once reduced in a DC/DC converter 230, to which an auxiliary power source and the auxiliary are connected. With such a structure, system volume and weight increase, as does power loss, because of the use of a DC/DC converter. In order for this system to be connected to a plurality of additional electric elements with different operating voltages, additional DC/DC converter or converters must be provided to the element with different operating voltage, resulting in a further increase of system volume, weight, and power loss.

A system enabling an auxiliary power source to be connected to a high voltage source without a DC/DC converter is disclosed in the form of an electric system for an electric vehicle in Japanese Patent Laid-open Publication No. Hei 11-178114. In the system disclosed in that publication, an auxiliary power source is connected between a motor neutral point, where ends of a plurality of windings of a motor are connected to one another, and a lower voltage side of a high voltage source. This system structure enables system volume and weight to be reduced through elimination of a DC/DC converter.

However, in this system, the operating voltage of the connected electric element or elements must remain within a constant range because an auxiliary power source, serving as an electric element, is simply connected to the motor neutral point. Therefore, it is difficult to improve operational efficiency of an electric element which varies its operating state, depending on the varying operating state. Moreover, connection of a plurality of electric elements with different operating voltages requires a DC/DC converter. That is, the system voltage and weight are increased, as is power loss.

SUMMARY OF THE INVENTION

The present invention has been conceived in view of the above. According to the present invention, there is provided an electric element control apparatus according to the present invention, comprises a charge-storage element; a neutral point selectively connected to either a higher voltage side or a lower voltage side of the charge-storage element via a selection switch; a plurality of electric elements connected between the neutral point and either the higher voltage side or the lower voltage side of the charge-storage element, each electric element generating, consuming, or storing electric power; and a selection switch control section for controlling switching of the selection switch to thereby control potential at the neutral point. The thus structured electric element control apparatus can control operation of a plurality of, or a plurality of types of electric elements through control of the potential at the neutral point. This makes it possible to simplify the structure of an apparatus compared to an apparatus wherein a control mechanism is provided for each electric element.

According to another aspect of the present invention, there is provided a battery system. The battery system comprises serially connected combination batteries. This structure enables reduction of an output voltage required to each combination battery included in the battery system, relative to the entire output voltage of the battery system, so that accuracy in controlling an output of each battery, and thus a battery system including the combination batteries, can be improved.

According to still another aspect of the present invention, there is provided a combination battery, comprising a charge-storage element; a plurality of power source units connected in parallel to the charge-storage element, each including a power source element for outputting electric power; and an open/close switch connected to the power source element, for controlling a current passing through the power source unit by switching itself; and an open/close switch control section for controlling switching of each open/close switch, wherein the combination battery outputs electric power stored in the charge-storage element. The combination battery outputs power stored in the charge-storage element. In addition, current to an electric element is controlled in a similar manner.

This structure can control input and output power for every power source element by controlling the open/close switch. Therefore, even when an output of, for example, one of the plurality of power source elements should drop, increasing outputs from the power source units excluding the one including the power source element with a dropped output can compensate the output loss due to the drop as a whole battery. That is, a battery output control can be achieved with improved accuracy.

In one aspect of the present invention, a combination battery may further preferably comprise a neutral point selectively connected to either a higher voltage side or a lower voltage side of the charge-storage element via a selection switch; and a selection switch control section for controlling switching of the selection switch. Preferably, the power source units are connected between the neutral point and either a higher voltage side or a lower voltage side of the charge-storage element. This structure enables easy and accurate controlling of a combination battery output through controlling of the potential at the neutral point.

In another aspect of the present invention, preferably, a combination battery may further comprise a pair of output terminals, one of which is connected to the neutral point and another is connected to either the higher voltage side or the lower voltage side of the charge-storage element. As the selection switch control section can control the potential at the neutral point to a desired value, as described above, the use of the neutral point as an output terminal allows use of the neutral point as a power source terminal for an external load.

In still another aspect of the present invention, a combination battery may further preferably comprise a load element connected between the neutral point and either the higher voltage side or the lower voltage side of the charge-storage element, for power consumption. As this structure enables control of a voltage applied to the load element, using the selection switch, there is no need to provide a separate voltage application mechanism and voltage control mechanism for each load element.

In yet another aspect of the present invention, the load element of a combination battery may preferably be a load element for driving the combination battery. A load element for a combination battery may include a load element necessary in driving or adjusting driving of the combination battery, e.g., for a combination battery in the form of a fuel battery, a hydrogen flow amount control pump, a methanol reforming heater, a cooling fan, and so on.

According to another aspect of the present invention, there is provided an inverter motor system comprising a charge-storage element for supplying a direct current;

an inverter having a plurality of selection switches each selectively connected to either a higher voltage side or a lower voltage side of the charge-storage element, for converting the direct current from the charge-storage element into a polyphase alternating current; a polyphase AC motor driven by the polyphase alternating current generated in the inverter; an electric element connected between a motor neutral point and either the higher voltage side or the lower voltage side, each electric element generating, consuming, or storing electric power, the motor neutral point being a point where one ends of a plurality of windings of the polyphase AC motor are connected to one another; a selection switch control section for controlling switching of the plurality of selection switches of the inverter to thereby control a potential at the motor neutral point; an open/close switch for switching between connections of the electric element to the motor neutral point and to either the higher voltage side or the lower voltage side of the charge-storage element, wherein the selection switch control section controls the plurality of selection switches, and switching of the open/close switch. As this arrangement enables desirable control of a voltage or current to to an electric element, appropriate operation of the electric element and improved system operation are facilitated.

In another aspect of the present invention, preferably, the selection switch control section controls switching of the plurality of switches and/or variably controls a potential at the motor neutral point, according to operational state of the plurality of electric elements. This allows the electric elements to operate appropriately according to the operational state thereof, so that system operation efficiency can be improved.

In yet another aspect of the present invention, preferably, each electric element is provided connectable to the higher voltage side and the lower voltage side of the charge-storage element via the open/close switch; and the selection switch control section controls the open/close switch so as to connect the electric element to either the higher voltage side or the lower voltage side of the charge-storage element. This enables appropriate switching of a voltage to apply or a current to supply to the electric elements, so that system operation efficiency can be improved.

In still another aspect of the present invention, preferably, an inverter motor system may further comprise a plurality of backflow circuits for each holding and backflowing a current passing through its associated electric element. This arrangement can eliminate power loss, so that system operation efficiency can be improved.

In yet another aspect of the present invention, preferably, the selection switch control section controls each switch according to operational state of its associated electric element among the plurality of electric elements included. As this arrangement enables appropriate controlling of a plurality types of electric elements, system volume, weight, and power loss can be reduced due to reduction of the number of DC/DC converters. Moreover, as the system can handle operation of a various kinds of electric elements, the system can be used in a wider variety of applications.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENTS

Figure 1:
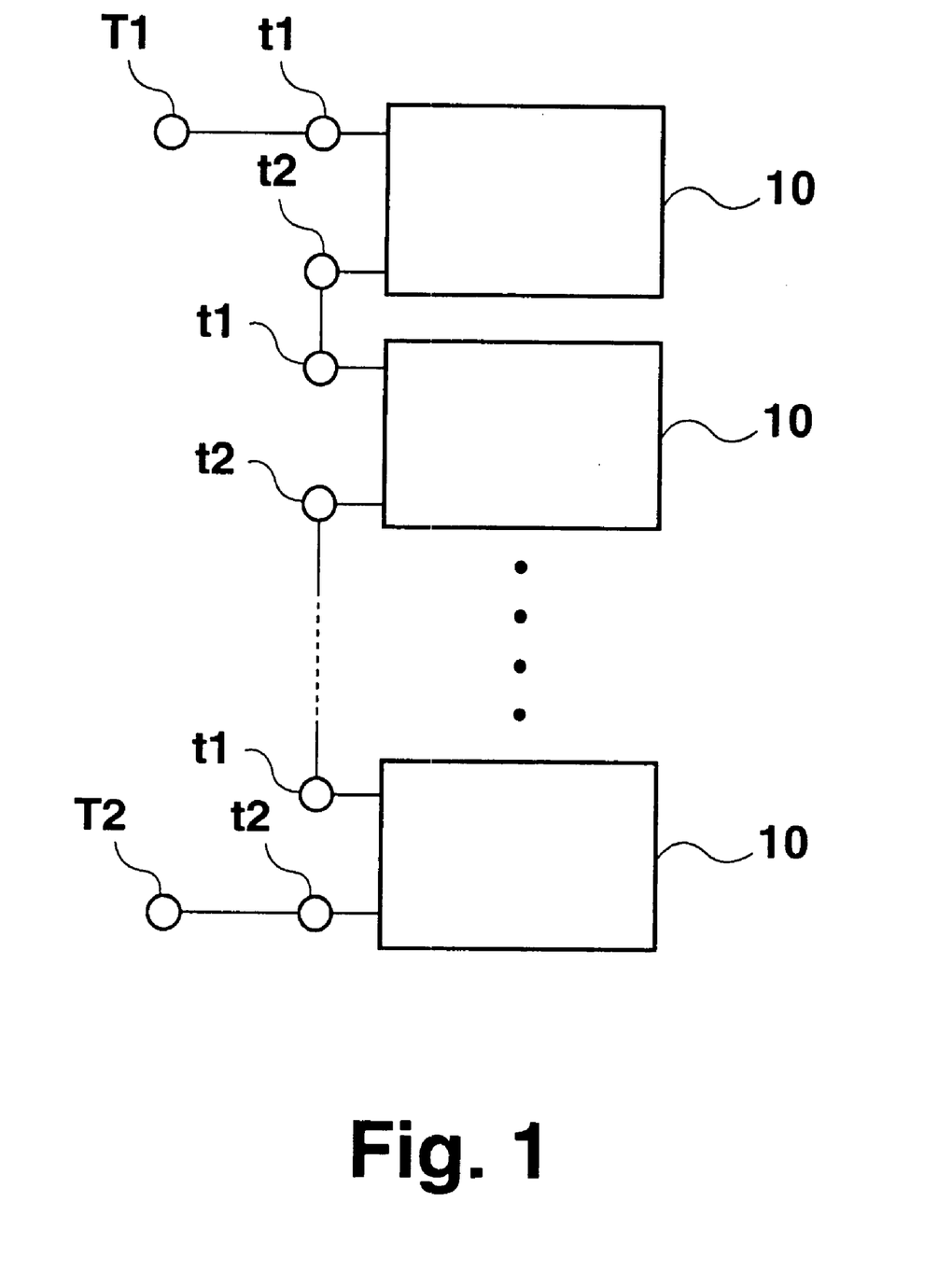
FIG. 1 is a diagram schematically showing a structure of a battery system in a preferred embodiment of the present invention.
Figure 2:
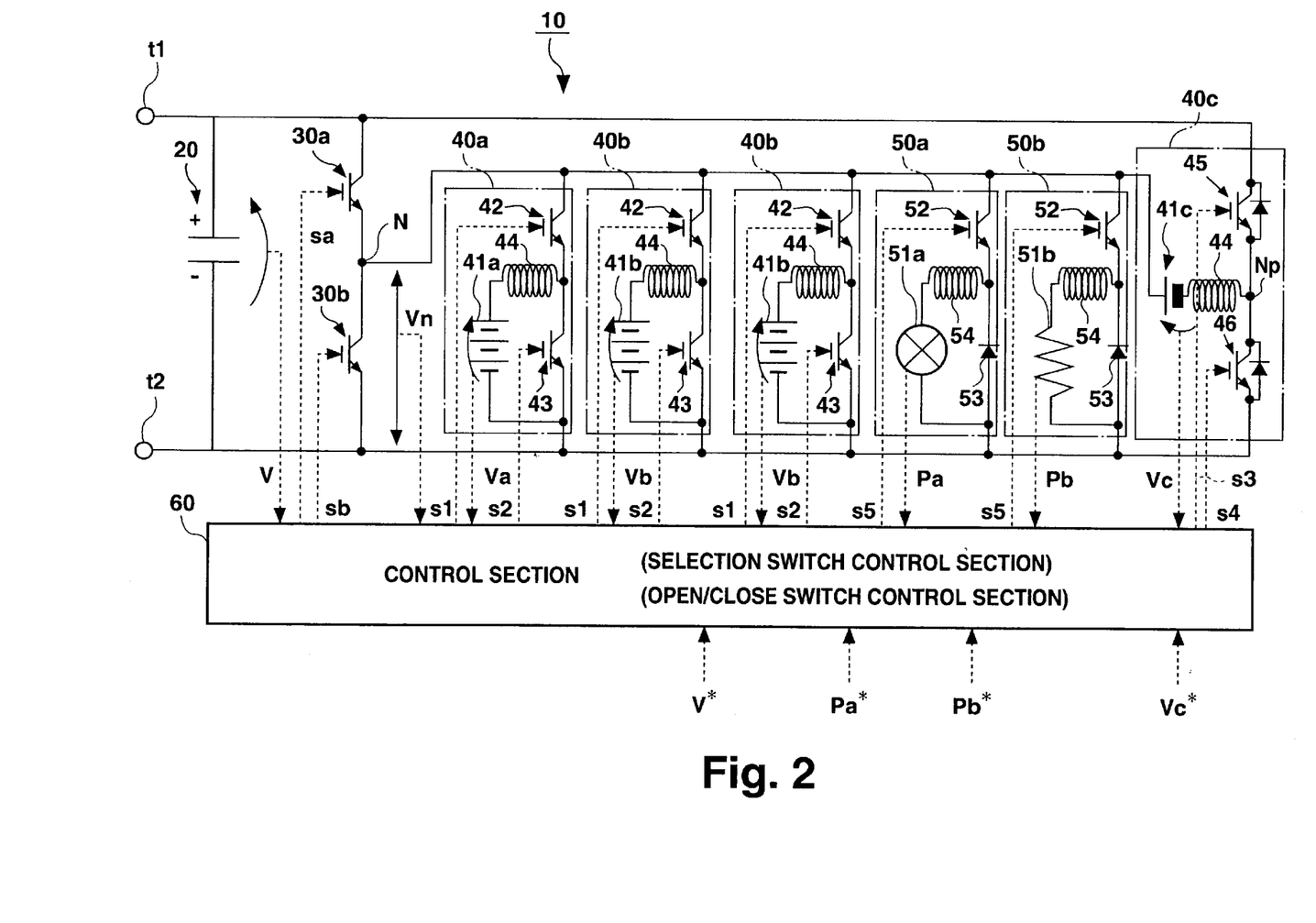
FIG. 2 is a diagram schematically showing a structure of a combination battery according to a first preferred embodiment of the present invention.
Figure 3:
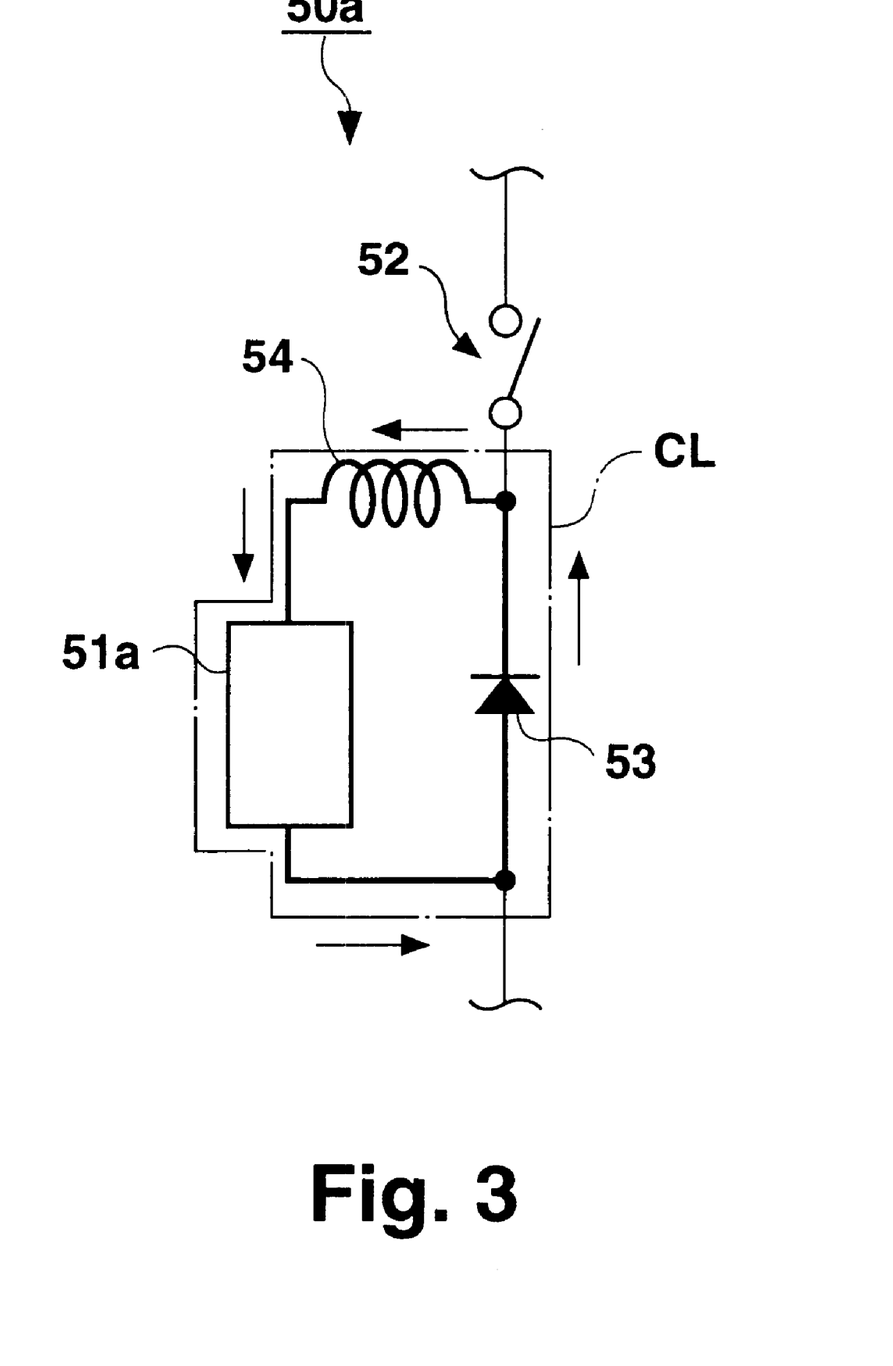
FIG. 3 is a circuit diagram of a load unit of a combination battery in the first preferred embodiment of the present invention.

In the following, a first preferred embodiment of the present invention will be described with reference to the drawings. FIG. 1 is a schematic diagram showing a battery system. FIG. 2 is a schematic diagram showing a structure of a combination battery. FIG. 3 is a diagram showing a circuit of a load unit.

A battery system 1 in this embodiment comprises a plurality of serially connected combination batteries 10. The positive terminal t1 of each combination battery 10 is connected to the negative terminal t2 of its adjacent combination battery 10. The positive terminal t1 of a combination battery 10 at one end of the row of combination batteries 10 is connected to the positive terminal T1 of the battery system 1. The negative terminal t2 of a combination battery at the other end of the row is connected to the negative terminal T2 of the battery system 1. The serial connection of a plurality of combination batteries enables reduction of an output voltage required to each combination battery, relative to the whole output of the battery system. A smaller output voltage for each combination battery in turn results in a narrower variable width of the output, so that accuracy of combination battery output control can be improved. Output voltages of the respective combination batteries 10 may be set to a common voltage, or to differing voltages.

A combination battery 10 has a charge-storage element 20 for power storage, and a plurality of power source units 40a, 40b, 40c, connected in parallel to the charge-storage element 20. Power from the respective power source units 40a, 40b, 40c is accumulated in the charge-storage element 20, and then output via output terminals T1, T2. Power may also be supplied from the charge-storage element 20 to the respective power source units 40a, 40b, 40c, when needed.

The combination battery 10 in this embodiment has a neutral point N of which potential Vn is intermediate between that on the higher voltage side of the charge-storage element 20 and that on the lower voltage side. The neutral point N is caused to be alternately connected to the higher and lower voltage sides by switching between the selection switches 30a, 30b. In this embodiment, two switches are provided, including a higher voltage side selection switch 30a (e.g., a power MOSFET) for connecting the neutral point N to the higher voltage side of the charge-storage element 20, and a lower voltage side selection switch 30b (e.g., a power MOSFET) for connecting the neutral point N to the lower voltage side. Through alternately closing these switches, the potential Vn at the neutral point N is controlled, such as by PWM control, for example. Specifically, the potential Vn at the neutral point N can be controlled through a ratio of time for which the neutral point N is connected to either the higher or lower voltage side. That is, the voltage Vn becomes higher when the neutral point N is connected to the higher voltage side for a longer time, and lower when the neutral point N is connected to the lower voltage side for a longer time.

The power source units 40a, 40b, 40c are respectively connected between the neutral point N and the higher or lower voltage side. In this embodiment, the power source units 40a, 40b are connected between the neutral point N and the lower voltage side, and the power source unit 40c is connected between the neutral point N and the higher side and also between the neutral point N and the lower side.

The power source unit 40a includes a rechargeable power source element 41a (e.g., a lead storage battery), and is connected between the neutral point N and the lower voltage side. The power source unit 40b comprises a discharging only source element 41b (e.g., a fuel battery). The power source elements 41a, 41b comprise a plurality of (e.g., three) serially connected lead storage cells and fuel battery cells, respectively, in this embodiment.

The power source units 40a and 40b have identical structures other than the power source elements 41a and 41b. That is, the power source units 40a, 40b each comprise a first open/close switch 42, (e.g. a power MOSFET), serially connected to the power. source element 41a, 41b, for controlling a current passing through the power source unit 40a, 40b, a coil 44, serially connected between the power source element 41a, 41b and the first open/close switch 42, and a second open/close switch 43 (e.g., a power MOSFET), connected in parallel to the serially connected power source element 41a, 41b and coil 44, for controlling a current passing through the power source unit 40a, 40b. As open/close switches 42, 43 are provided for each power source element, an output of each power source element 41a, 41b can be controlled by controlling its associated open/close switches 42, 43. It should be noted that the first and second switches 42, 43 are controlled so as to close alternately.

The coil 44 holds a current passing therein. Therefore, the current passing through the coil 44 with the second open/close switch 43 closed will pass through the first open/close switch 42 closed when the second open/close switch 43 is opened. This current is output from the associated power source unit 40a, 40b.

In the above structure, the state of power transmission/reception between the power source element 41a, 41b and the neutral point N varies depending on which between the voltage of the power source element 41a, 41b and a potential difference between both ends of the power source unit 40a, 40b (i.e., a voltage across the power source unit 40a, 40b) is larger, and a ratio of time for which the open/close switches 42, 43 remain open/closed. That is, when the potential at the positive electrode of the power source element 41a, 41b is higher than the potential Vn at the neutral point N (i.e., the voltage of the power source element 41a, 41b is larger than the voltage across the power source unit 40a, 40b), the amount of current flowing from the power source element 41a, 41b to the neutral point N side increases when the first open/close switch 42 remains closed for a longer time, and the amount of current flowing in the opposite direction increases when the first open/close switch 42 remains closed for a shorter time.

On the other hand, when the potential on the positive electrode of the power source element 41a, 41b is smaller than the potential Vn at the neutral point N (i.e., the voltage of the power source element 41a, 41b is smaller than a voltage across the power source unit 40a, 40b), the amount of current flowing from the neutral point N side to the power source element 41a, 41b increases when the first open/close switch 42 remains closed for a longer time, and the amount of current flowing in the opposite direction increases when it remains closed for a shorter time.

The power source unit 40c has a rechargeable power source element 41c (e.g., an auxiliary driving lead storage battery). The positive terminal of the power source element 41c is connected to the neutral point N, and its negative terminal is connected, via the coil 44, to a midpoint Np between two open/close switches 45, 46, which are serially connected between the higher and lower voltage sides. A protection diode is provided in parallel to each of the open/close switches 45, 46.

The state of power transmission and reception between the power source element 41c and the neutral point N varies according to which between a difference in potential between the neutral point N and the higher or lower voltage side and a voltage of the power source element 41c is larger, and according to a ratio of time for which the open/close switches 45, 46 remain open or close. That is, when the potential difference between the neutral point N and the lower voltage side is larger than the voltage of the power source element 41c, the amount of current flowing from the neutral point N side to the power source element 41c increases when the open/close switch 46 remains closed for a longer time. To the contrary, when the potential difference between the neutral point N and the lower voltage side is smaller than the voltage of the power source element 41c, the amount of current flowing in the opposite direction from the above then increases.

In a thus structured power source unit 40c, when the potential Vn at the neutral point N is controlled such that a potential difference between the neutral point N and the higher voltage side and that between the neutral point N and the lower voltage side differ, voltages of two different magnitudes can be readily applied to the power source element 41c by switching between the two open/close switches 45, 46.

The combination battery 10 further comprises load units 50a, 50b for power consumption. In this embodiment, a load unit 50a having a load element 51a (e.g., a hydrogen flow amount control pump of a fuel battery) and. a load unit 50b having a load element 51b (e.g., a methanol reforming heater of a fuel battery) are connected between the neutral point N and the lower voltage side. The incorporation of a load element for a combination battery into a battery system results in a battery system having a compact structure, as compared with a case where load units are separately provided.

The load units 50a and 50b have identical structures, except for load elements 51a and 51b. Specifically, the load units 50a, 50b each comprise an open/close switch 52 (e.g., a power MOSFT), serially connected to the load element 51a, 51b; a coil 54, serially connected between the load element 51a, 51b and the open/close switch 52; and a diode 53, connected in parallel to the serially connected load element 51a, 51b and the coil 54. It should be ntoed that another open/close switch may replace the diode 53.

When the open/close switch 53 remains open, a backflow circuit CL is resultantly formed where current passes through the load element 51a, 51b, the diode 53, and the coil 54 in that order. In this case, the coil 54 holds a backflow current. That is, this structure can hold, and backflow, a current passing through the load element 51a, 51b, enabling power to be used effectively.

In this structure, the open/close switch 52 remaining closed for a longer time results in an increase in the current flowing into the load element 51a, 51b, and the open/close switch 52 remaining closed for a shorter time results in a decrease of such a current. The control section 60 controls switching between the selection switches 30a and 30b, and opening/closing of the respective open/close switches 42, 43, 45, 46 to thereby control power transmission and reception between the power source units 40a, 40b, 40c and the charge-storage element 20, as well as operation of the load units 50a, 50b.

The control section 60 receives a determined voltage V across the charge-storage element 20, a determined potential Vn at the neutral point N, determined voltage values Va, Vb, Vc of the respective power source elements 41a, 41b, 41c, determined operational state signals on the respective load elements 51a, 51b, an output voltage command signal V*, output command signals Pa*, Pb* for the respective load elements 51a, 51b, and an output command signal Ic* for the auxiliary battery 41c. An operation state signal is a signal indicative of an output state of the load element 51a, 51b, an example of the signal being a discharge amount of a pump 51a and the temperature of a heating section of a heater 51b. An output voltage command signal V* and output command signals Pa*, Pb*, Ic* are input externally, for example, from an ECU. Based on the received and determined values and command signals, the control section 60 generates control signals sa, sb for the selection switches 30a, 30b, and control signals s1, s2, s3, s4, s5 for the respective open/close switches 42, 43, 45, 46, 52, respectively. In this embodiment, a potential difference Vn between the lower voltage side and the neutral point N is used as potential at the neutral point N.

The control section 60 compares the output voltage command signal V* and the determined voltage V across the charge-storage element 20, and controls the device such that the voltage V across the charge-storage element 20 conforms with the output voltage command signal V*. Specifically, when the voltage V is lower than the output voltage command signal V*, control is applied so as to increase the amount of current output from the respective power units 40a, 40b, 40c to the charge-storage element 20. More specifically, should the voltage Va, Vb of the power source element 41a, 41b be larger than the voltage across the power source unit 40a, 40b (i.e., Vn in this embodiment), the first open/close switch 42 is controlled to remain close for a longer time (i.e., the second open/close switch 42 is controlled to remain close for a shorter time). On the contrary, should the voltages Va, Vb of the power source elements 41a, 41b be smaller than the voltage across the power source units 40a, 40b (i.e., Vn), the first open/close switch 42 is controlled to remain closed for a shorter time (i.e., the second open/close switch 42 is controlled to remain closed for a longer time). Alternatively, the selection switches 30a, 30b may be controlled to thereby control the potential at the neutral point N for adjustment the relationship concerning which is larger or smaller between the voltages Va, Vb of the power source elements 41a, 41b and a difference in potential Vn between the both ends of the power source unit 40a, 40b (i.e., a voltage across the power source unit 40a, 40b ). Differing from the above, when the voltage V across the charge-storage element 20 is larger than the output voltage command signal v*, control is applied so as to reduce the amount of current output from the respective power units 40a, 40b, 40c to the charge-storage element 20.

Further, the control section 60 controls outputs of the respective power source elements 41a, 41b, 41c, based on the determined voltage values Va, Vb, Vc of the respective power source elements 41a, 41b, 41c. Specifically, when a dropped output from the power source element 41a is determined, the open/close switches 42, 43 of the power source unit 40a are controlled so as to increase the amount of current flowing into the power source element 41a. Alternatively, the open/close switches 42, 43, 45, 46 of the power source unit 40b, 40c may instead be controlled so as to increase the amount of current output from power source elements 41b, 41c. Still alternatively, the selection switches 30a, 30b may be controlled to thereby control the potential Vn at the neutral point N.

Still further, the control section 60 compares an output voltage command Vc* for the auxiliary battery 41c and the determined voltage Vc across the auxiliary battery 41c, and controls such that the voltage Vc across the auxiliary battery 41c accords with the output command signal Vc* for the auxiliary battery 41c. Specifically, when the output voltage Vc of the auxiliary battery 41c is smaller relative to the output command signal Vc*, the control section 60 controls the open/close switches 45, 46 or the selection switches 30a, 30b so as to charge the auxiliary battery 41c, i.e., so as to increase the amount of current flowing from the neutral point N to the auxiliary battery 41c.

Yet further, the control section 60 compares output command signals Pa*, Pb* for the respective load elements 51a, 51b and the determined operational state signals Pa, Pb, and controls such that the operational state accords with the output command. Specifically, in the case where an output determined from the operational state signals Pa, Pb is insufficient relative to the output command signals Pa*, Pb*, the control section 60 controls the open/close switch 52 and the selection switches 30a, 30b so as to increase the voltages V across the load elements 51a, 51b.

Figure 4:
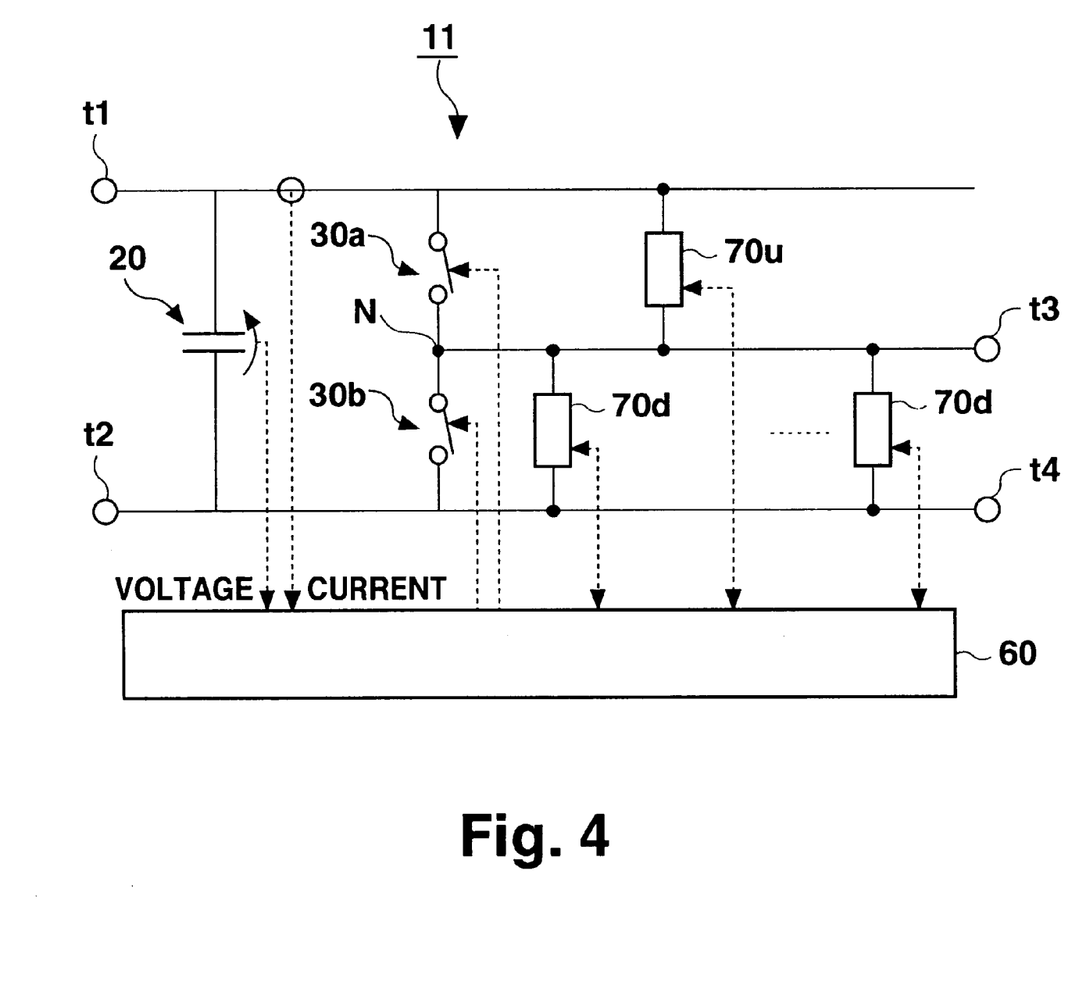
FIG. 4 is a diagram schematically showing a structure of a combination battery according to a second preferred embodiment of the present invention.

In the following, a second preferred embodiment of the present invention will next be described with reference to the accompanied drawings. FIG. 4 is a diagram schematically showing a structure of a combination battery 11 according to this embodiment.

The combination battery 11 in this embodiment comprises at least one electric element unit 70d, connected between the lower voltage side of the charge-storage element 20 and the neutral point N, and at least one other electric element unit 70u, connected between the higher voltage side of the charge-storage element 20 and the neutral point N. These electric element units 70d, 70u are each a circuit having any of power generation, consumption, and storage elements. For example, these units 70d, 70u may each be constructed having a circuit structure identical to that of the power source unit 40a, 40b, the load unit 50a, 50b, or the like, as in the first embodiment. In this embodiment, similar to the first embodiment, the control section 60 controls the selection switches 30a, 30b to control the potential Vn at the neutral point N, and an open/close switch (not shown) included in each of the electric element units 70d, 70u, to thereby control power transmission and reception between an electric element and the charge-storage element 20 or between respective power elements. Similar as inthe first embodiment, the control section 60 performs the above mentioned control based on the respective determined values or signals (e.g., the voltage V across the charge-storage element 20, a current value on the higher voltage side of the charge-storage element 20, the potential Vn at the neutral point N, the voltage values of the respective electric elements, an operational state signal, an output voltage command signal, an output command signal, and so on).

The combination battery 11 of the present embodiment further comprises output terminals t3, t4, in addition to the output terminals t1, t2, at the neutral point N and on the lower voltage side, respectively. This structure makes it possible to control the potential at the neutral point N into a predetermined value so that the neutral point N can be used in power supplying to an external load.

Figure 5:
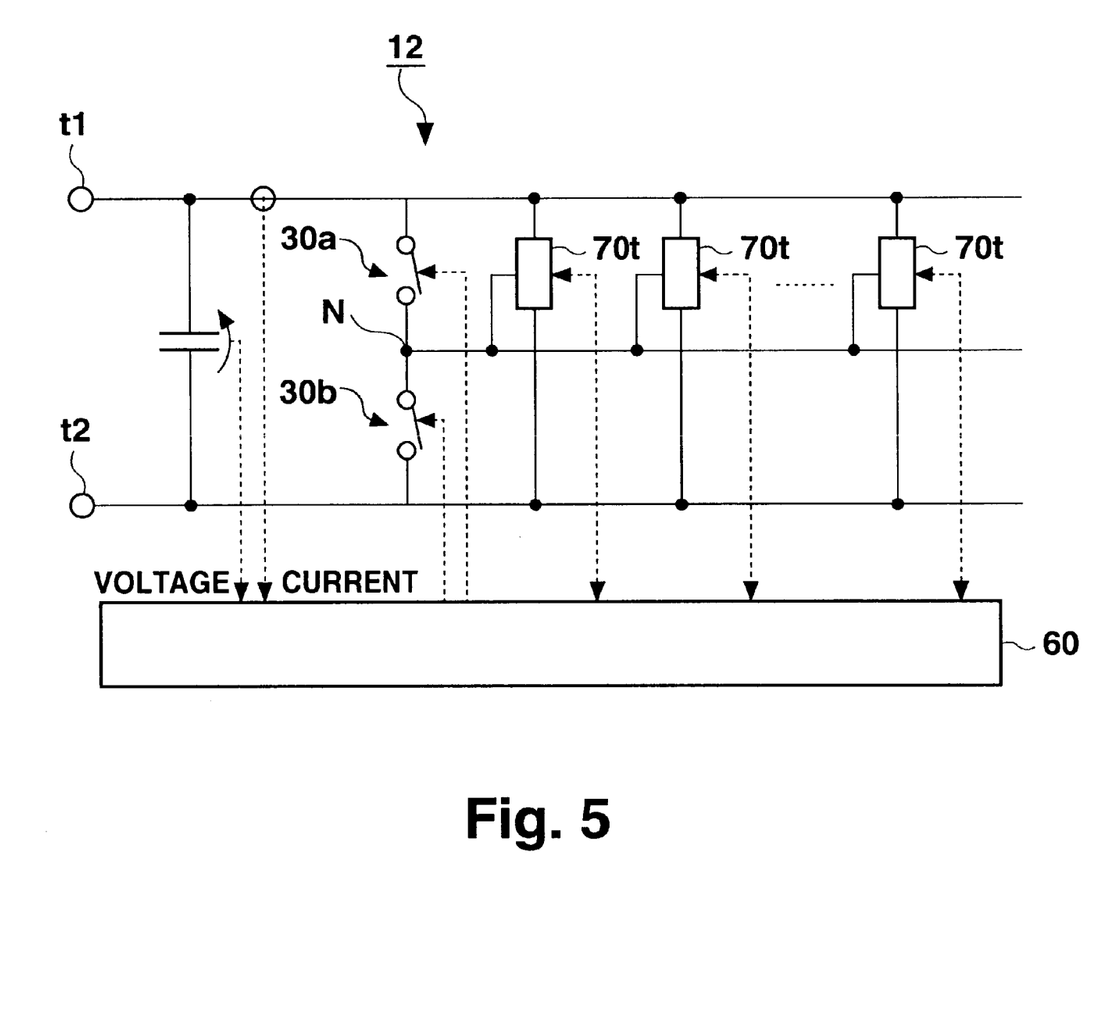
FIG. 5 is a diagram schematically showing a structure of a combination battery according to a third preferred embodiment of the present invention.

In the following, a third preferred embodiment of the present invention will be described with reference to the accompanying drawings. FIG. 5 is a schematic diagram showing a structure of a combination battery 12 according to this embodiment.

The combination battery 12 in this embodiment comprises a plurality of electric element units 70t, connected between the neutral point N and either the lower or higher voltage side of the charge-storage element 20. These electric element units 70t are each a circuit having any of power generation, consumption, or storage electric elements. For example, these units 70t may each be constructed having a circuit structure identical to that of the power source unit 40c in the first embodiment, i.e., a circuit comprising an electric element, of which one end is connected to the neutral point N, and a selection switch for selectively connecting the other end of the electric element to the lower or higher voltage side of the charge-storage element. The control section 60 controls the respective sections in the same manner as in the first or second preferred embodiment.

Figure 6:
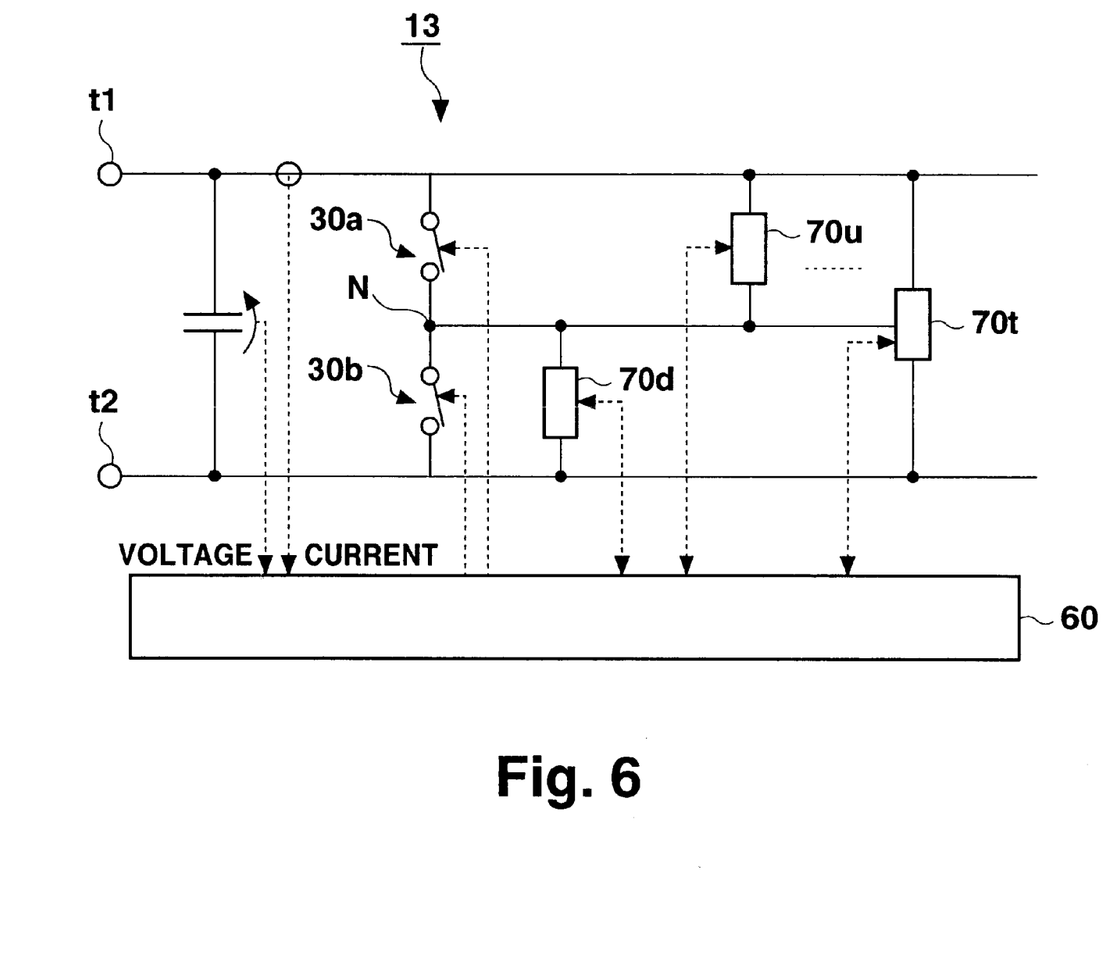
FIG. 6 is a diagram schematically showing a structure of a combination battery according to a fourth preferred embodiment of the present invention.

Next, a fourth preferred embodiment of the present invention will be described with reference to the accompanying drawings. FIG. 6 schematically shows a structure of a combination battery 13 according to this embodiment.

The combination battery 13 in this embodiment comprises an electric element unit 70t, connected between the neutral point N and either the lower or higher voltage side of the charge-storage element 20; another electric element unit 70d, connected between the lower voltage side of the charge-storage element 20 and the neutral point N; and a still another electric element unit 70u, connected between the higher voltage side of the charge-storage element 20 and the neutral point N. Each of the electric elements 70t, 70d, 70u has a structure identical to that of a respective electric element unit 70t, 70d, 70u as employed in the second or third preferred embodiment of the present invention. The control section 60 controls the respective sections in the same manner as in the first, second, or third preferred embodiments.

It should be noted that the present invention is not limited to the above described preferred embodiments. Electric element connection manner may include the following three types:

(1) connection between the neutral point N and the higher voltage side of a major charge-storage element 20 (e.g., an electric element including the electric element unit 70u in the second embodiment);

(2) connection between the neutral point N and the lower voltage side of a major charge-storage element 20 (e.g., the power source element 41a, 41b, the load unit 51a, 51b, and so on in the first embodiment); or (3) selective connection between the neutral point N and either the higher or lower voltage side of the charge-storage element 20 (e.g., the power source element 41c in the first embodiment).

That is, connection manners for an electric element are not limited to those described in the above described preferred embodiments, and two or more electric elements may be connected according to any of the above mentioned connection manners (1) to (3). In addition, two or more of the above mentioned connection manners may be co-employed in a single circuit structure. An electric element connected in the manner (1) or (2) may be connected directly, i.e., without via a switch, to the neutral point N or on the higher or lower voltage side of the charge-storage element 20.

As the potential at the neutral point N can be set at an appropriate value according to the connected electric element, the potential difference between the neutral point N and the higher voltage side of the charge-storage element 20 and that between the neutral point N and the lower voltage side of the charge-storage element 20c an be set to different values. This arrangement enables generation of a potential difference required in operation (e.g., employment of electric elements with different rated voltages). In addition, a plurality (e.g., two) types of potential differences can be selectively applied to an electric element connected in the connection manner (3) described above.

Various types of chemical batteries (e.g., nickel metal hydride battery, lithium-ion battery, and soon), an AC power source, and so on can be used as a power source element, regardless as to whether or not the source element is rechargeable. An EHC heater, an AC100V source transformer, and so on can be connected as a load element. An electric double layered capacitor and so on may be used as a charge-storage element, and a capacitor may replace the charge-storage element to provide a rechargeable battery.

In any of the above described first to fourth preferred embodiments, the control section 60 controls the selection switches 30a, 30b, or an open/close switch or a selection switch included in each electric element unit to thereby control power transmission/reception between the charge-storage element 20 and an electric element or among the respective electric elements. In light of this configuration, the combination battery and the battery system described in the above preferred embodiments can be described as an electric element control apparatus controlling a plurality of electric elements connected in parallel to a major charge-storage element (i.e., a charge-storage element 20). This structure enables the controlling of input/output power control for various types of electric elements, using an integrated circuit structure. Consequently, there can be provided an apparatus having a simpler structure that would be the case when a separate control mechanism is provided to each electric element. Moreover, accurate and efficient power control of each electric element is made possible through control of the selection switch and/or an open/close switch provided for each electric element. It should be noted that an output terminal of a combination battery or a battery system is not indispensable when the combination battery or the battery system is constructed as an electric element control apparatus.

As described above, according to the present invention, power transmission and reception between a major charge-storage element and each of a plurality of electric elements connected in parallel to the charge-storage element can be controlled through control of an open/close switch or a selection switch. Consequently, accuracy in output control for a combination battery and a battery system including a combination battery can be improved. Moreover, an electric element control apparatus having a plurality of electric elements integrated in a compact manner can be realized.

Figure 7:
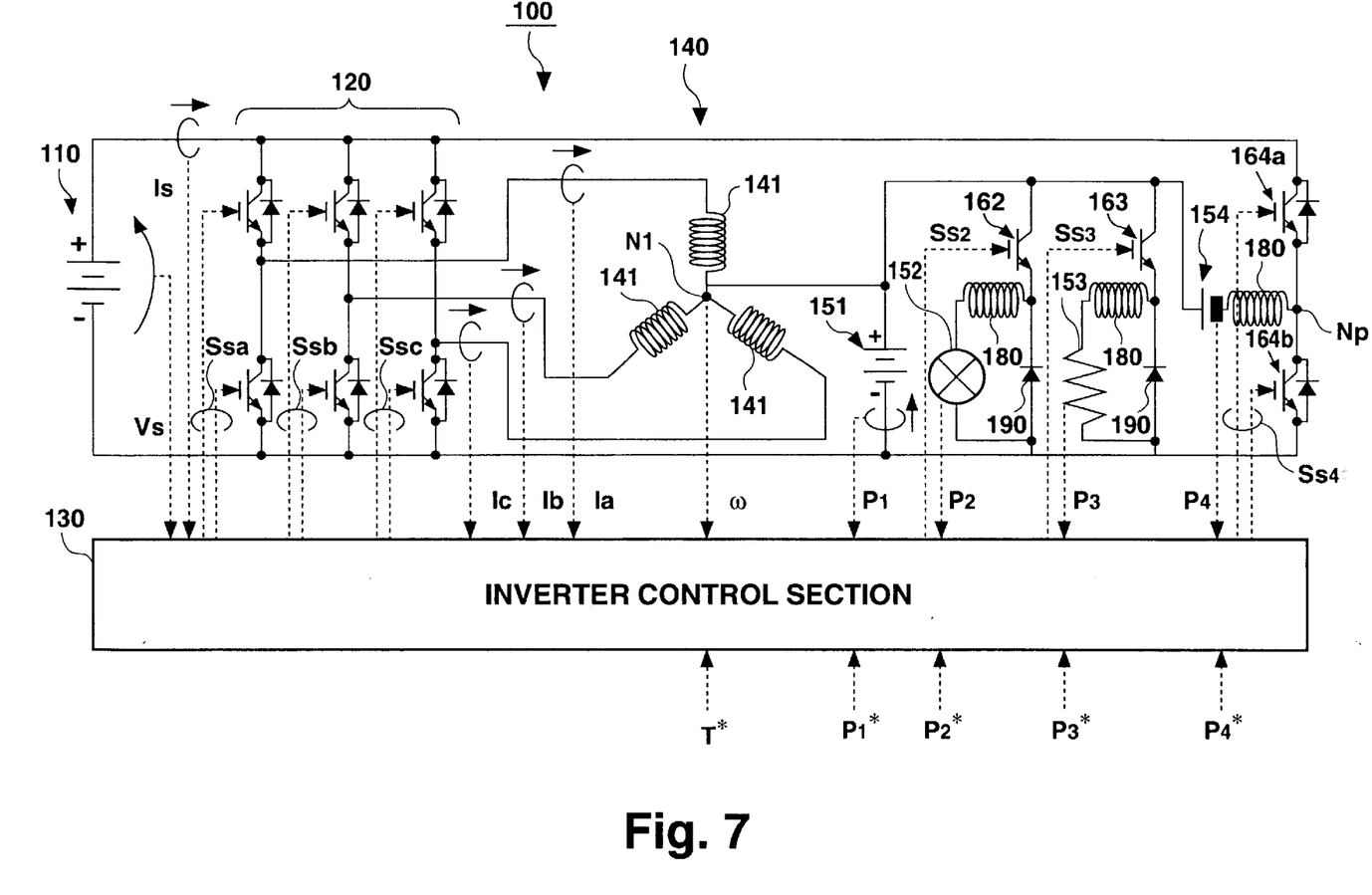
FIG. 7 is a circuit diagram showing an inverter motor system according to the fifth preferred embodiment of. the present invention.
Figure 8:
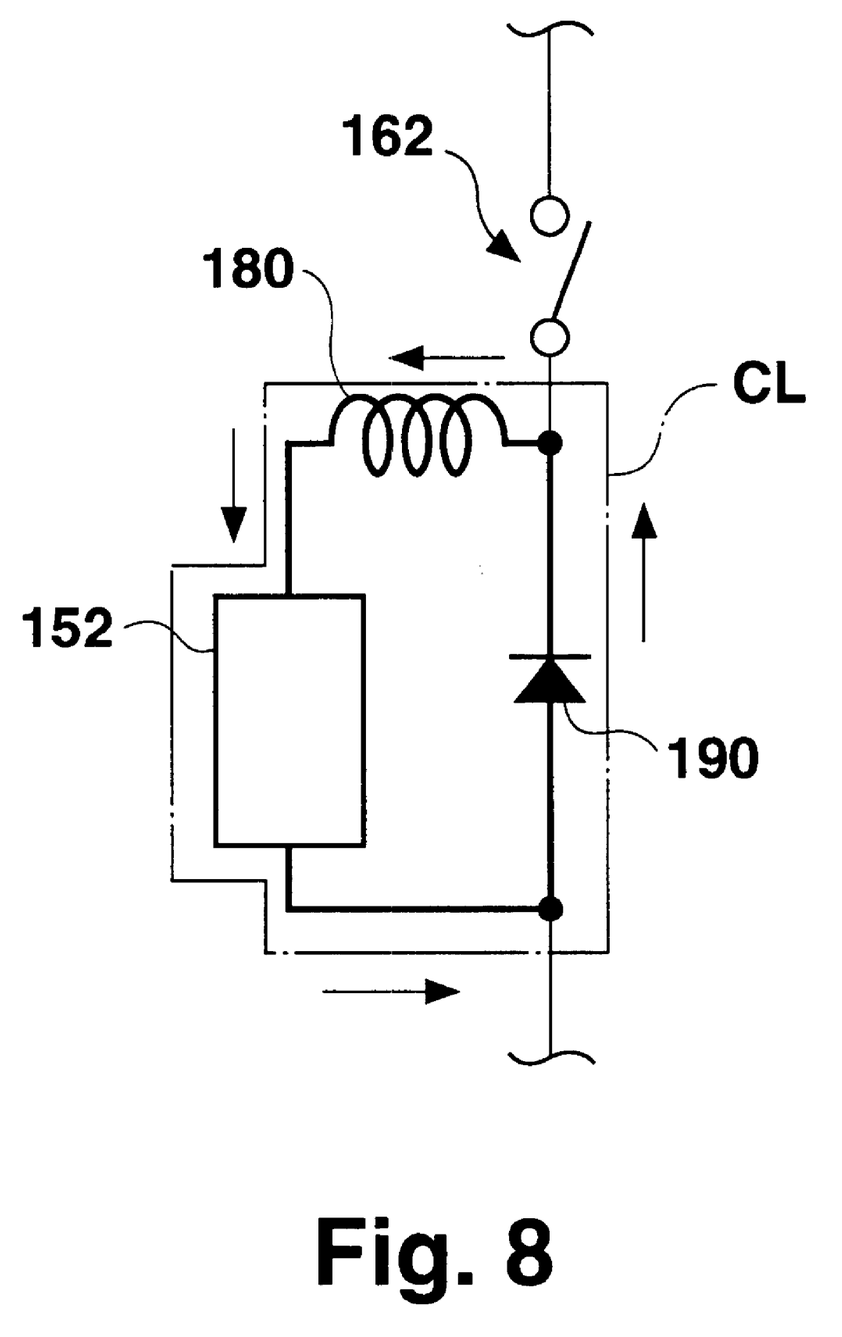
FIG. 8 is a diagram explaining a backflow circuit holding a current passing through an electric element in the embodiment shown in FIG. 7.
Figure 9:
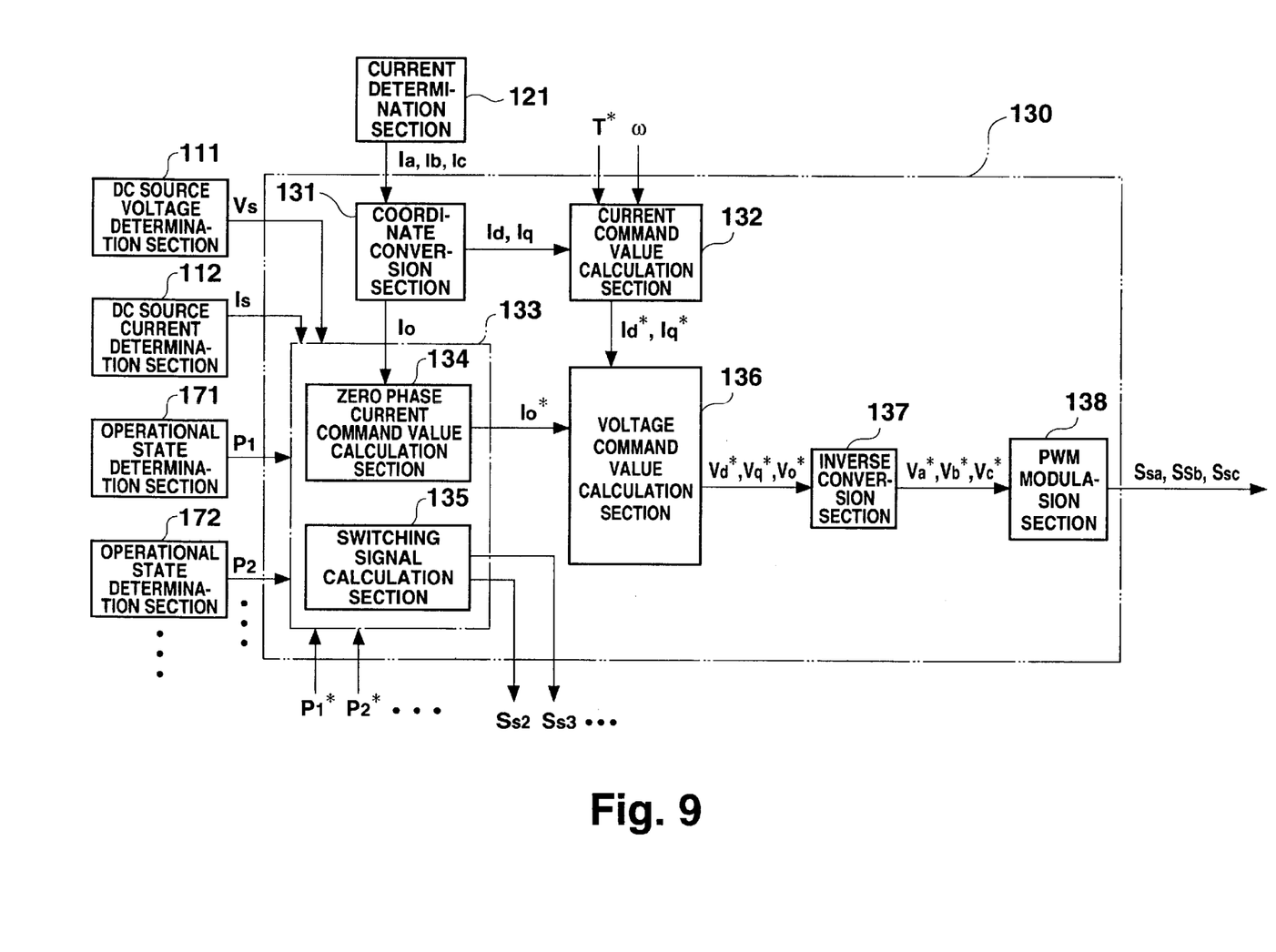
FIG. 9 is a block diagram showing an inverter control section in the embodiment shown in FIG. 7.

Next, a fifth preferred embodiment of the present invention will be described with reference to the accompanied drawings, in which an inverter motor system of the present invention is applied o a fuel battery hybrid electric vehicle inverter motor system. FIG. 7 is a circuit diagram schematically showing a structure of n inverter motor system. FIG. 8 is a diagram explaining a backflow circuit. FIG. 9 is a block diagram showing an inverter control section.

A DC from a DC source 110 (e.g., a nickel metal hydride secondary battery) is converted in an inverter 120 into a polyphase AC (e.g., a three phase AC), which in turn is used to drive a polyphase AC motor 140 (e.g., a three phase AC motor). In this system 100, DC power can be transmitted between the DC source 110 and the fuel battery 151 through operation of the inverter 120 in a zero voltage vector mode. That is, under control of the inverter 120, a current to the motor 140 can also be supplied from the fuel battery 151 side. As described above, the inverter motor system 100 of the present invention is constructed in the form of a fuel battery hybrid system in which a DC power source 110 and a fuel battery 151 both supply a current to the motor 140.

One set of ends of each of a plurality of windings 141 of the motor 140 are connected to one another, to thereby constitute a motor neutral point N1. An electric element (e.g., a power source 151, 154) for power generation, another electric element (e.g., a load 152, 153) for power consumption, and still another electric element (e.g., a capacitor) for power storage are connected between the motor neutral point N1 and the higher or lower voltage side of the DC source. In the example of this embodiment, a power source 51 (e.g., a fuel battery), a load 52 (e.g., a hydrogen flow amount control pump of a fuel battery), a load 53 (e.g., a methanol reforming heater of a fuel battery), and a power source 54 (e.g., an auxiliary battery) are connected between the motor neutral point N1 and the lower voltage side.

The system 100 in this embodiment comprises open/close switches 162, 163, 164a, 164b (e.g., a MOSFET) each for switching between connection and disconnection between an electric element and the higher or lower voltage side of the DC power source or the motor neutral point N1. Specifically, the system 100 comprises open/close switches 162, 163 for respectively switching between connection and disconnection between the loads 152, 153 and the motor neutral point N1 side, a switch 164a for switching between connection and disconnection between the power source 154 and the higher voltage side of a DC power source 110, and a switch 164b for switching between connection and disconnection between the power source 154 and the lower voltage side of the DC power source 110. The switching by these switches 162, 163, 164a, 164b may be controlled by a selection switch control section or an open/close switch control section, but in the example of the present embodiment control is performed by an inverter control section 130 (described in detail later). The two switches 164a, 164b for switching between connection and disconnection between the power source 154 and the higher or lower voltage side of the DC source 110 are controlled by the inverter control section 130 such that the midpoint Np is connected to either the higher or lower voltage side.

A coil 180 is connected between the electric element 152, 153, 54 and the switch 162, 163, 164a and 164b, respectively, for smoothening a sharp change in current and voltage caused by witching the switch 162, 163, 164a, 164b. A diode 190 is connected in parallel to the serially connected coil 180 and electric element 152, 153, for suppressing a current flowing from the higher to lower voltage sides. The above structure constitutes a backflow circuit CK, where a current flows from the electric element 152, 153, the diode 190, and the coil 180 in this order (in the direction of the arrow in FIG. 8) when the switch 162, 163 remains open. In this case, the coil 180 holds a backflow current. That is, this structure can hold and backflow a current passing through an electric element, allowing efficient power use without waste. The diode 90 may be replaced by a switch controlled by the inverter control section 130.

In addition to rotation control of the motor 140, the inverter control section 130 controls the inverter for variable control of the potential Vn of the motor neutral point N1, as well as the respective switches 162, 163, 164a, 164b. The inverter control section 130 comprises a coordinate conversion section 131, a current command value calculation section 132, an electric element control section 133, a voltage command value calculation section 136, an inverse conversion section 137, and a PWM modulation section 138. Operation of these sections will be described with reference to FIG. 9.

Current Ia, Ib, Ic in the motor 140, as determined in a current determination section 121, is supplied to a coordinate conversion section 131 for coordinate conversion so as to be expressed in a dq coordinate system, where a field pole direction constitutes a d axis and the direction orthogonal to the field pole direction constitutes a q axis, and currents Id, Iq, associated with the respective axes, and a zero phase current Io are calculated. The current command value calculation section 132 calculates current command values Id*, Iq*, based on the currents Id, Iq; a rotation speed signal ω of the motor 140; and a torque command value T*, supplied externally, for example, from a system control section (ECU) (not shown).

The electric element control section 133 receives a zero phase current Io, calculated in the coordinate conversion section 131; a DC source voltage Vs, determined in the DC source voltage determination section 111; a DC source current Is, determined in the DC source current determination section 112; operational state signals P1, P2, P3, P4 (hereinafter referred to as Pi), determined in the operational state determination section 171, 172; and output command signals P1*, P2*, P3*, P4* (hereinafter referred to as Pi*) addressing electric elements. An operational state signal is a signal indicative of an output state of an electric element, e.g., an output voltage of a fuel battery 151, a discharge amount of a pump 152, the temperature of a heating section of a heater 153, and an output voltage of an auxiliary battery 154. An output command signal is a signal via which an external ECU commands respective electric elements to output.

The electric element control section 133 comprises a zero phase current command value calculation section 134 for calculating a zero phase current command value Io*, a switching signal calculation section 135 for calculating a switching signal Ss2, Ss3, . . . (hereinafter referred to as Ssi) for controlling switching of the respective switches 62, 63, 64a, 64b. The zero phase current command value calculation section 134 calculates a zero phase current command value Io*, which determines the potential Vn at the motor neutral point N1, according to the respective signals input to the electric element control section 133, in other words, operational state of the DC source and the respective electric elements. Specifically, in the case where a DC source voltage Vs lower than a predetermined value is determined, a zero phase current command value Io* is determined such that the fuel battery 151 increases its output. Moreover, the zero phase current command value calculation section 134 receives and compares an output command signal Pi* and an operational state signal Pi, and, when it is determined that an output of the electric element is not sufficiently large to fulfill the output command, determines a zero phase current command value Io* such that the electric element provides an output in accordance with the command. Specifically, in the case where the operational state signal P2 presents a discharge flow amount value lower than the value indicated by a received output command signal P2*, which instructs an increase of a discharging flow amount of the pump 52, a zero phase current command value Io* is determined such that an increased amount of voltage is applied to the pump 52, in other words, the potential Vn at the motor neutral point N1 increases.

The switching signal calculation section 135 calculates a switching signal Ssi according to the respective signals input to the electric element control section 133, i.e., operational state of the DC source and the respective electric elements. More specifically, the switching signal calculation section 135 receives and compares an output command signal Pi* and an operational state signal Pi, and, when it is determined that an output of the electric element is not large enough to be commensurate with the output command, determines a switching signal Ssi such that the electric element provides an output in accordance with the command. Specifically, when the operational state signal P3 presents an output value lower than a value indicated by a received output command signal P3*, which instructs an increase of an output of the heater 53, a switching signal Ssi is determined such that an increased amount of voltage is applied to the heater 53 so that the heater 53 increases its output. In other words, the switch 63 is connected to the motor neutral point N1 side for a longer time.

The voltage command value calculation section 136 calculates voltage command values Vd*, Vq*, Vo* based on Id*, Iq*, calculated in the current command value calculation section 132, and Io*, calculated in the zero phase current command value calculation section 134. That is, a command value Vo* corresponding to the potential Vn at the motor neutral point N1 is calculated based on the zero phase current command value Io*. Subsequently, the inverse conversion section 137 calculates voltage command values Va*, Vb*, Vc* for the current with respective phases, as a result of coordinate conversion of the voltage command values Vd*, Vq*, Vo*. The PWM modulation section 138 calculates switching signals Ssa, Ssb, Ssc for current with the respective phases in inverter 120 based on the calculated Va*, Vb*, Vc*.

For connection of an electric element for power generation (e.g., a power source) to the system, the magnitude of a current passing through the power source can be controlled through the above described variable controlling of the potential vn at the motor neutral point N1, according to which is larger between the voltage of that power source and a potential difference between points at which the power source is connected (i.e., a potential difference between the motor neutral point N1 and either higher or lower voltage side of the combination battery 10). Specifically, when the potential Vn at the motor neutral point N1 is controlled such that a potential difference between the motor neutral point N1 and the lower voltage side of the DC source 110 becomes higher than the voltage of a power source (e.g., an auxiliary battery 154), an increased amount of current flows into the auxiliary battery 154, which is thus charged with more current. However, when the potential Vn at the motor neutral point N1 is controlled such that a potential difference between the motor neutral point N1 and the lower voltage side of the DC source 110 becomes lower than the voltage of the auxiliary battery 154, relatively less current flows into the auxiliary battery 154, which therefore is charged with less current. As described above, the charging amount can be controlled according to requirements, which can improve power efficiency.

It should be noted that the present invention is not limited to the above described fifth preferred embodiment. Specifically, whereas in the above example an electric element is connected between the motor neutral point N1 and the lower voltage side of a DC source, the electric element may instead be connected between the motor neutral point N1 and the higher voltage side of the DC source. Alternatively, some electric element may be connected between the motor neutral point N1 and the higher voltage side of the DC source while other may be connected between the motor neutral point N1 and the lower voltage side.

Various types of electric elements are connectable. In addition to the above described fuel battery and nickel metal hydrogen battery, chemical batteries (e.g., a lithium ion, lead, or the like), an AC source, and so on are connectable as a power generating power source whether or not it is rechargeable. An EHC heater, an AC100V source transformer, and so on may be connectable as a power consuming load. An electric double layered capacitor or the like may be used as a charge-storage element.

Alternatively, an electric element may be connected to the system in a manner allowing selective connection to any two of the motor neutral point N1 side, the higher voltage side, and the lower voltage side by means of a plurality of switches controlled by the inverter control section 130. Such a structure enables application of a plurality of different levels of potential differences to an electric element through control of the switch, such that control efficiency can be further improved.

As the potential Vn at the motor neutral point N1 can be set at any value, a potential difference between the motor neutral point N1 and the higher voltage side of the DC source 110 and that between the motor neutral point N1 and the lower voltage side of the DC source 110 can be set at different values. This allows incorporation of a suitable electric element to the system, which accords with the respective potential differences. Further, provision of a switch enabling selective connection between any desired two of the motor neutral point N1 side, the upper voltage side, and the lower voltage side, as described above, allows the number of settable potential difference levels to be increased, thereby facilitating system size reduction and power efficiency improvement.

As described above, according to the present invention, a voltage or current supplied to an electric element connected to an inverter motor system can be desirably controlled. This facilitates operation of the electric element, so that system operation efficiency can be improved. In addition, as a variety of electric elements can be incorporated into the system, the size of an electric system, as well as power consumption, can be reduced.

What is claimed is:

1. An electric element control apparatus, comprising:
   a charge-storage element;
   a neutral point selectively connected to either a higher voltage side or a lower voltage side of the charge-storage element via a selection switch;
   a plurality of electric elements connected between the neutral point and either the higher voltage side or the lower voltage side of the charge-storage element, each electric element generating, consuming, or storing electric power; and
   a selection switch control section for controlling switching of the selection switch to thereby control potential at the neutral point.

2. A battery system including a plurality of combination batteries connected in series, wherein each combination battery comprises:
   a charge-storage element;
   a plurality of power source units connected in parallel to the charge-storage element, each including
   a power source element for outputting electric power; and
   an open/close switch connected to the power source element, for controlling a current passing through the power source unit by switching itself; and
   an open/close switch control section for controlling switching of each open/close switch.

3. A combination battery, comprising:
   a charge-storage element;
   a plurality of power source units connected in parallel to the charge-storage element, each including
   a power source element for outputting electric power; and
   an open/close switch connected to the power source element, for controlling a current passing through the power source unit by switching itself; and
   an open/close switch control section for controlling switching of each open/close switch,
   wherein
   the combination battery outputs electric power.stored in the charge-storage element.

4. A combination battery according to claim 3, further comprising:
   a neutral point selectively connected to either a higher voltage side or a lower voltage side of the charge-storage element via a selection switch; and
   a selection switch control section for controlling switching of the selection switch;
   wherein
   each power source unit is connected between the neutral point and either a higher voltage side or a lower voltage side of the charge-storage element.

5. A combination battery according to claim 3, further comprising a pair of output terminals one of which is connected to the neutral point and another is connected to either the higher voltage side or the lower voltage side of the charge-storage element.

6. A combination battery according to claim 4, further comprising a load element connected between the neutral point and either the higher voltage side or the lower voltage side of the charge-storage element, for power consumption.

7. A combination battery according to claim 6, wherein the load element is a load element for driving the combination battery.

8. An inverter motor system, comprising:
   a charge-storage element for supplying a direct current;
   an inverter having a plurality of selection switches each selectively connected to either a higher voltage side or a lower voltage side of the charge-storage element, for converting the direct current from the charge-storage element into a polyphase alternating current;
   a polyphase AC motor driven by the polyphase alternating current generated in the inverter;
   an electric element connected between a motor neutral point and either the higher voltage side or the lower voltage side, each electric element generating, consuming, or storing electric power, the motor neutral point being a point where one ends of a plurality of windings of the polyphase AC motor are connected to one another;

a selection switch control section for controlling switching of the plurality of selection switches of the inverter to thereby control a potential at the motor neutral point;

an open/close switch for switching between connections of the electric element to the motor neutral point and to either the higher voltage side or the lower voltage side of the charge-storage element, wherein the selection switch control section controls the plurality of selection switches, and switching of the open/close switch.

9. An inverter motor system according to claim 8, wherein the selection switch control section controls switching of the open/close switch and/or variably controls a potential at the motor neutral point, according to operational state of the electric element.

10. An inverter motor system according to claim 8, wherein the electric element is provided connectable to the higher voltage side and the lower voltage side of the charge-storage element via the open/close switch; and the selection switch control section controls the open/close switch so as to connect the electric element to either the higher voltage side or the lower voltage side of the charge-storage element.

11. An inverter motor system according to claim 8, further comprising a backflow circuit for holding and backflowing a current passing through the electric element.

* * * * *